(12) United States Patent
Hietmann et al.

(10) Patent No.: US 9,579,792 B2
(45) Date of Patent: Feb. 28, 2017

(54) METHOD AND DEVICE FOR ADJUSTING AND CONTROLLING MANIPULATORS

(75) Inventors: Gerhard Hietmann, Herbertshofen (DE); Martin Weiss, Margertshausen (DE)

(73) Assignee: KUKA Roboter GmbH, Augsburg (DE)

(*) Notice: Subject to any disclaimer, the term of this patent is extended or adjusted under 35 U.S.C. 154(b) by 3102 days.

(21) Appl. No.: 11/719,182

(22) PCT Filed: Nov. 16, 2005

(86) PCT No.: PCT/EP2005/012280
§ 371 (c)(1),
(2), (4) Date: May 11, 2007

(87) PCT Pub. No.: WO2006/056349
PCT Pub. Date: Jun. 1, 2006

(65) Prior Publication Data
US 2009/0076653 A1    Mar. 19, 2009

(30) Foreign Application Priority Data
Nov. 25, 2004  (DE) .................... 10 2004 056 861

(51) Int. Cl.
*G06F 17/00* (2006.01)
*B25J 9/16* (2006.01)
(52) U.S. Cl.
CPC ... *B25J 9/1641* (2013.01); *G05B 2219/37429* (2013.01); *G05B 2219/39181* (2013.01); *G05B 2219/41127* (2013.01); *G05B 2219/41154* (2013.01)

(58) Field of Classification Search
USPC .............................. 700/252, 245; 901/2, 50; 74/490.01–490.06
See application file for complete search history.

(56) References Cited

U.S. PATENT DOCUMENTS

| | | | | | |
|---|---|---|---|---|---|
| 4,500,823 | A | * | 2/1985 | Walrath | 318/632 |
| 4,540,923 | A | * | 9/1985 | Kade et al. | 318/561 |
| 5,140,535 | A | * | 8/1992 | Raff et al. | 702/104 |
| 5,679,091 | A | * | 10/1997 | Salecker et al. | 477/86 |
| 5,767,648 | A | * | 6/1998 | Morel et al. | 318/568.1 |
| 6,256,570 | B1 | * | 7/2001 | Weiberle et al. | 701/70 |
| 6,394,208 | B1 | * | 5/2002 | Hampo et al. | 180/65.25 |

(Continued)

OTHER PUBLICATIONS

Alin Albu-Schaeffer; Technische Universität München; Regelung von Robotern mit elastischen Gelenken am Beispiel der DLR-Leichtbauarme; 2002.

*Primary Examiner* — Mussa A Shaawat
*Assistant Examiner* — Kyung Kim
(74) *Attorney, Agent, or Firm* — Wood Herron & Evans LLP

(57) ABSTRACT

Methods and apparatus for adjusting and controlling a robotic manipulator based on a dynamic manipulator model. A model for gear mechanism friction torque is determined for at least one axis, based on driven axis speeds and accelerations, and on a motor temperature on the drive side of one of the motors that is associated with the axis. The model is used to determine target values, such as motor position or current. The gear mechanism friction torque that complies with the model is determined in accordance with a gear mechanism temperature.

34 Claims, 10 Drawing Sheets

Figure 1:
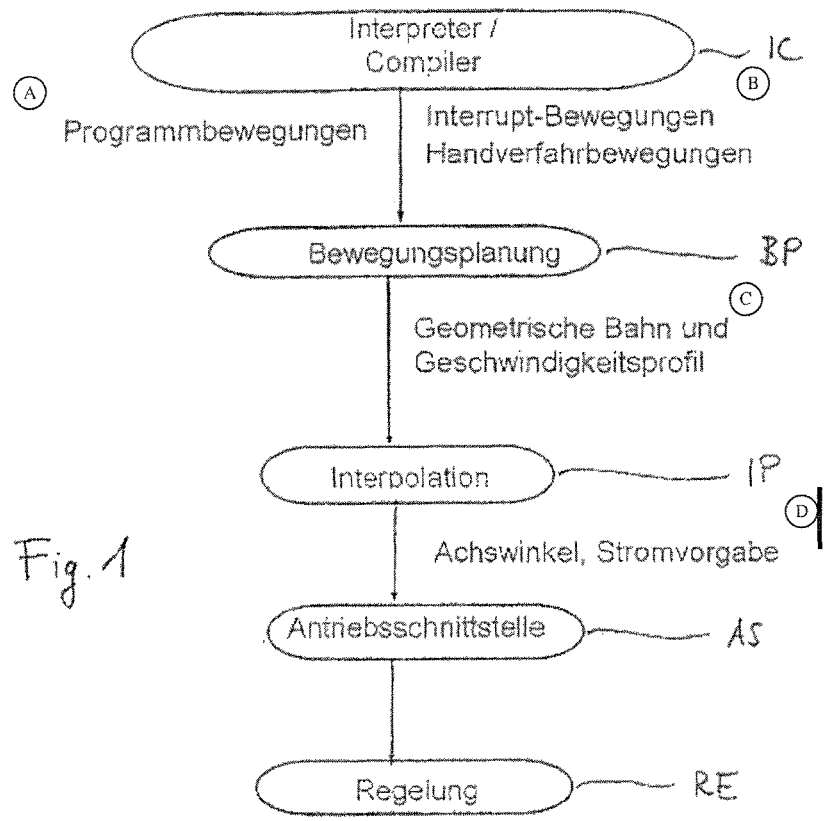

Key:
- A  Program movements
- B  Interrupt movements
-    Manual displacement movements
- BP Movement planning
- C  Geometric path and speed profile
- D  Axis angle, current specification
- AS Drive interface
- RE Adjustment

(56) References Cited

U.S. PATENT DOCUMENTS

| | | | |
|---|---|---|---|
| 7,130,718 B2* | 10/2006 | Gunnarsson et al. | 700/254 |
| 7,742,838 B2* | 6/2010 | Weiß | 700/248 |
| 2004/0069750 A1* | 4/2004 | Kato et al. | 219/86.1 |
| 2004/0093119 A1* | 5/2004 | Gunnarsson et al. | 700/245 |
| 2004/0159354 A1* | 8/2004 | Cederstav et al. | 137/487.5 |
| 2005/0187696 A1* | 8/2005 | Stroh | 701/84 |

* cited by examiner

| Key: | A | Program movements |
|---|---|---|
| | B | Interrupt movements |
| | | Manual displacement movements |
| | BP | Movement planning |
| | C | Geometric path and speed profile |
| | D | Axis angle, current specification |
| | AS | Drive interface |
| | RE | Adjustment |

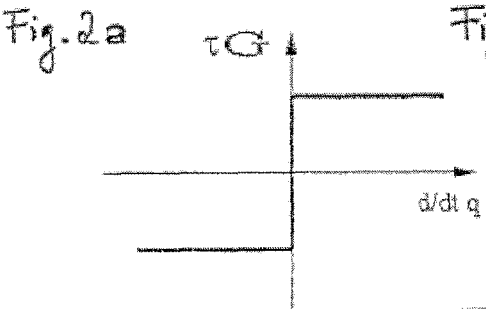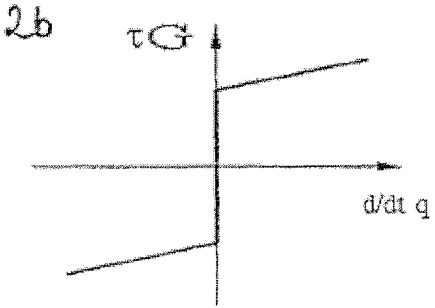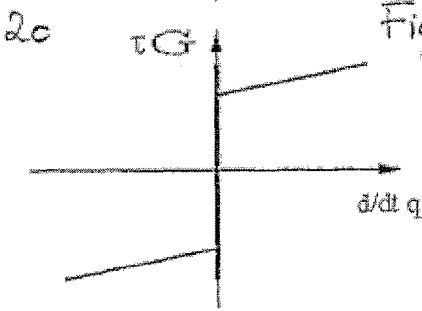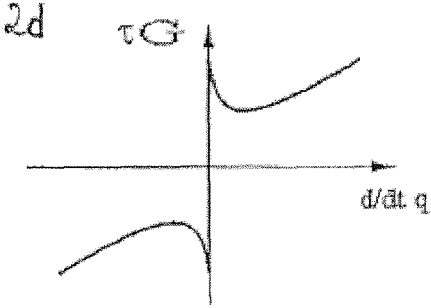

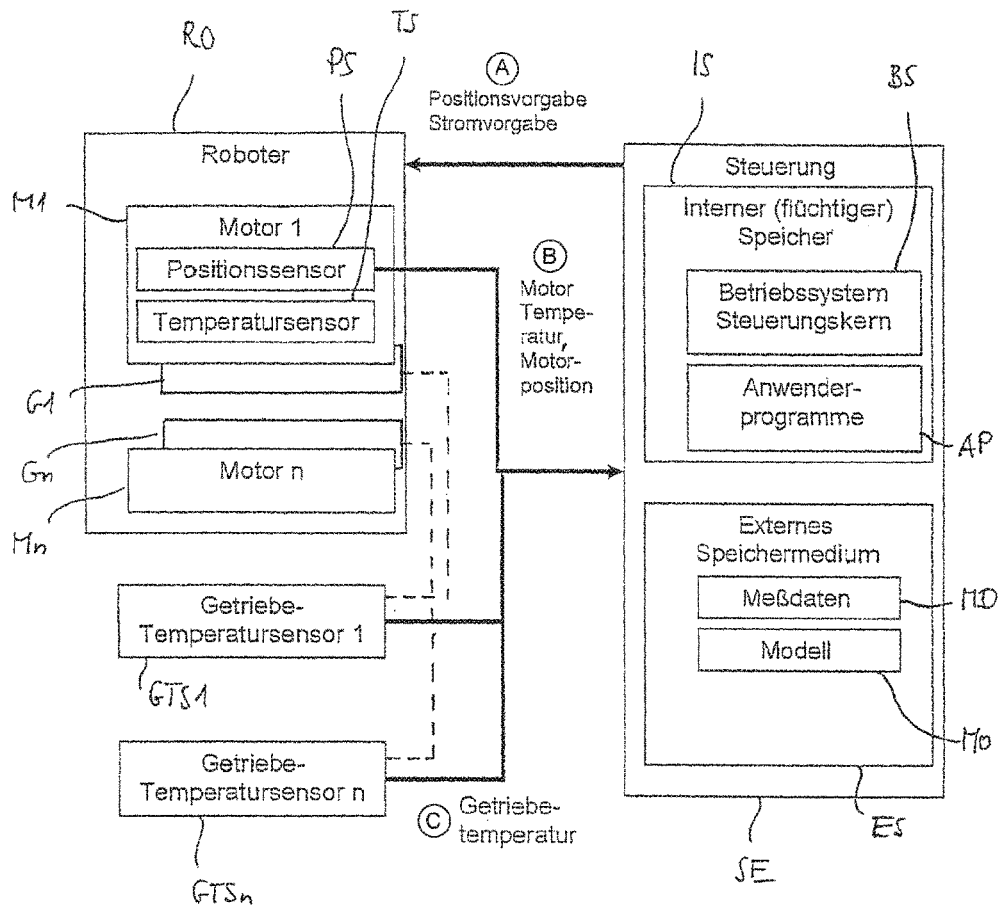

Fig. 3

| Key: | A | Position specification | SE | Control unit |
|---|---|---|---|---|
| | | Current specification | IS | Internal (volatile) memory |
| | B | Motor temperature, motor position | BS | Operating system |
| | C | Gear mechanism temperature | | Control core |
| | RO | Robot | AP | Application programs |
| | PS | Position sensor | ES | External storage medium |
| | TS | Temperature sensor | MD | Measurement data |
| | GTS1 | Gear mechanism temperature sensor 1 | MO | Model |
| | GTSn | Gear mechanism temperature sensor n | | |

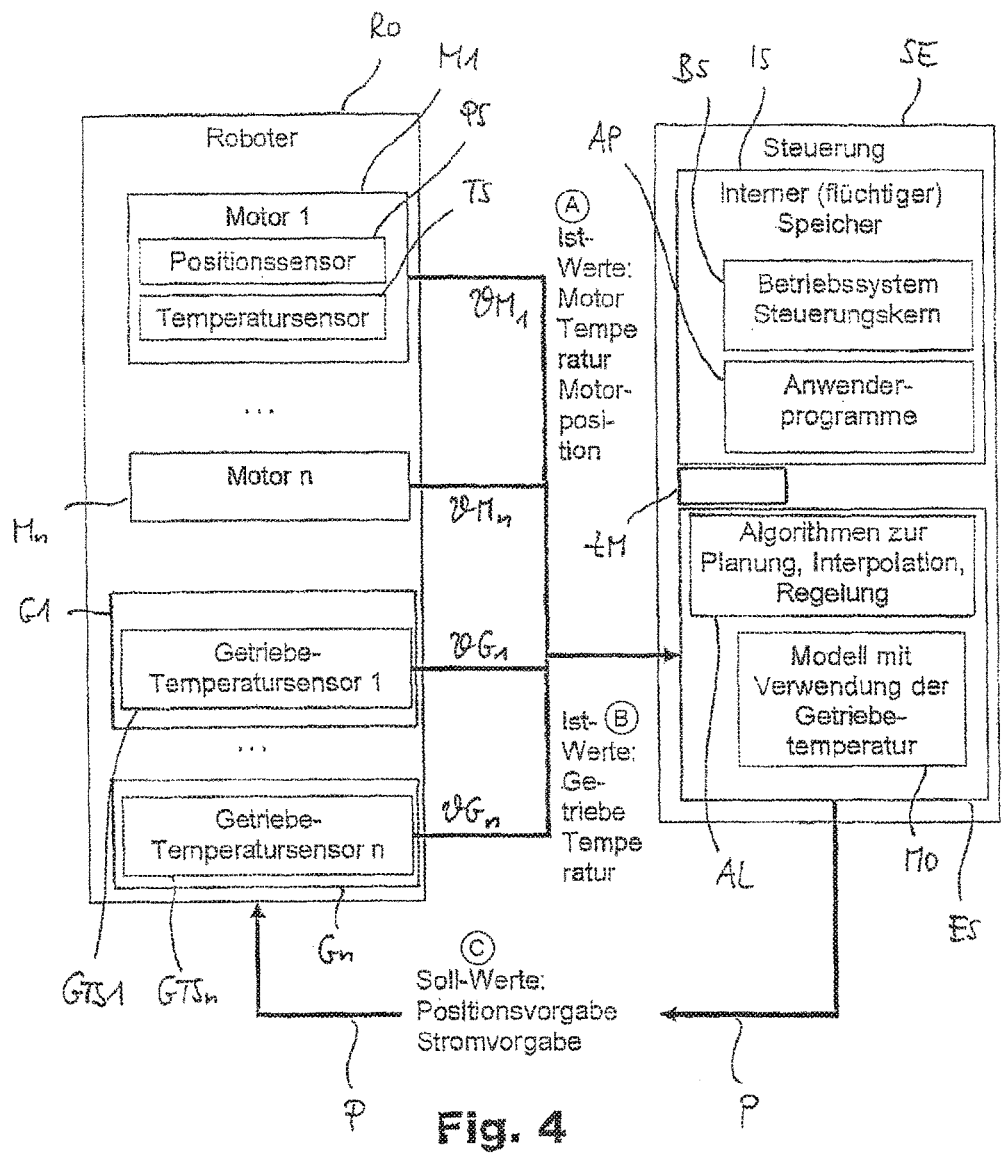

Fig. 4

| Key: | A | Actual values: motor temperature, motor position |
|---|---|---|
| | B | Actual values: gear mechanism temperature |
| | C | Target values: position specification |
| | | Current specification |
| | RO | Robot |
| | PS | Position sensor |
| | TS | Temperature sensor |
| | GTS1 | Gear mechanism temperature sensor 1 |
| | GTSn | Gear mechanism temperature sensor n |
| | SE | Control unit |
| | IS | Internal (volatile) memory |
| | BS | Operating system |
| | | Control core |
| | AP | Application programs |
| | AL | Algorithms for planning, interpolation, adjustment |
| | MO | Model using gear mechanism temperature |

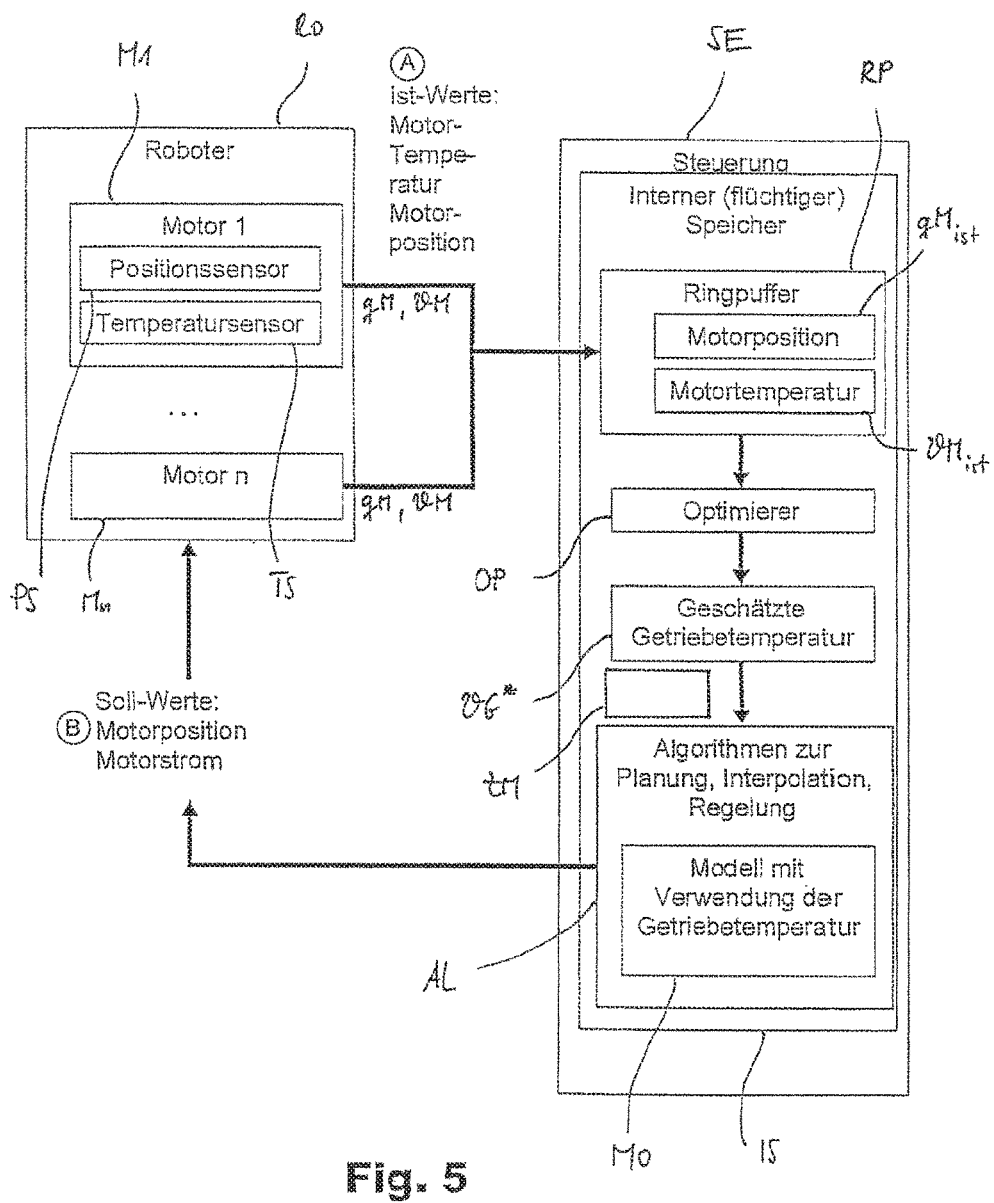

Fig. 5

| Key: | A | Actual values: motor temperature, motor position |
|---|---|---|
| | B | Target values: motor position, motor current |
| | RO | Robot |
| | PS | Position sensor |
| | TS | Temperature sensor |
| | SE | Control unit |
| | IS | Internal (volatile) memory |
| | RP | Circular buffer |
| | $qM_{ist}$ | Motor position |
| | $\vartheta M_{ist}$ | Motor temperature |
| | OP | Optimizer |
| | $\vartheta G^*$ | Estimated gear mechanism temperature |
| | AL | Algorithms for planning, interpolation, adjustment |
| | MO | Model using gear mechanism temperature |

Key: 1 Acceleration
2 Time

Key: 1 Velocity
2 Time

Fig. 6c
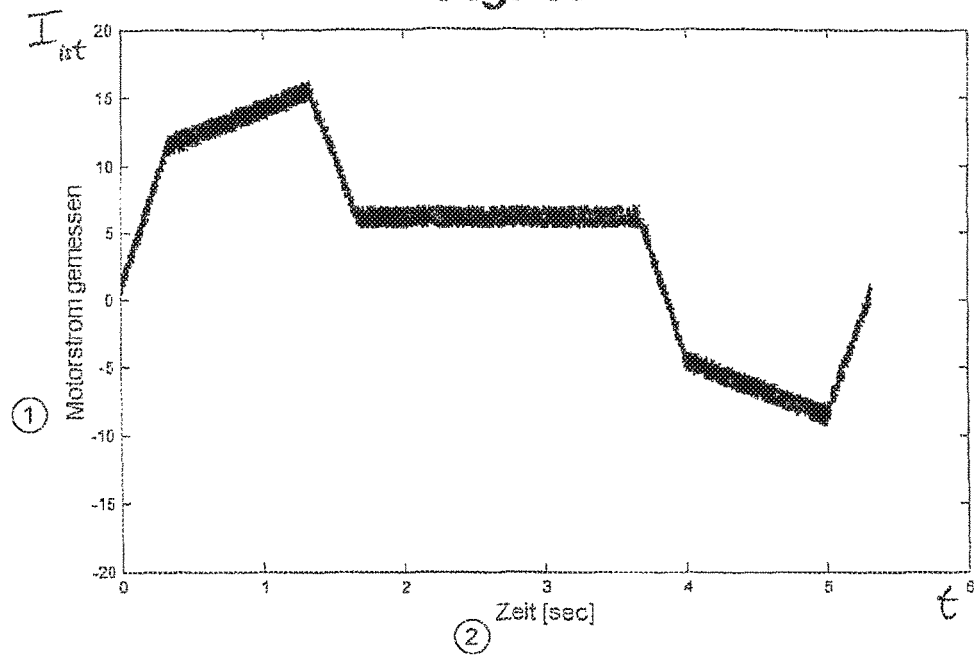
Key: 1 Motor current, measured
     2 Time
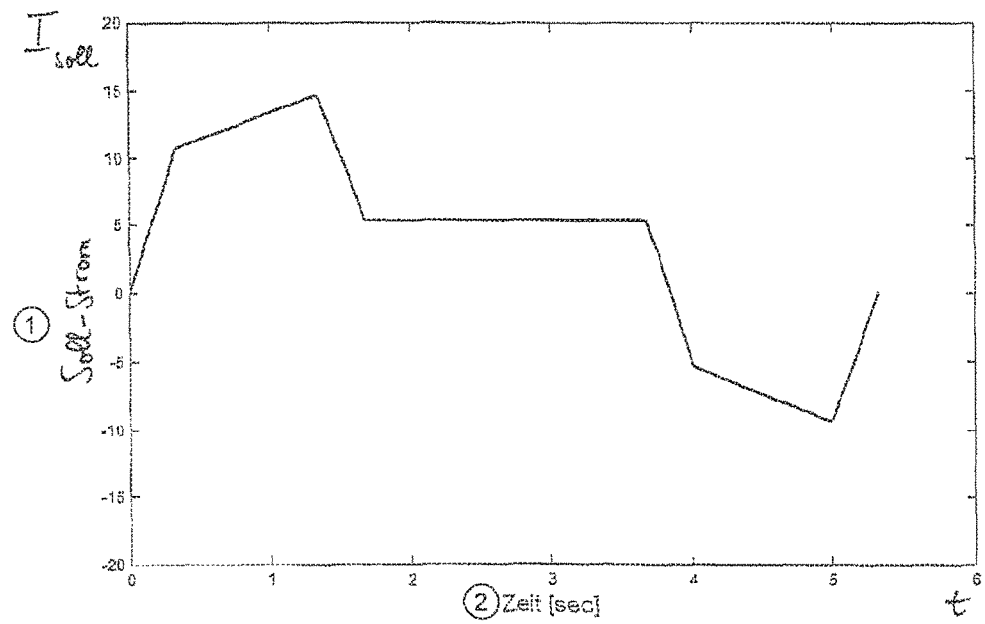
Fig. 6d
Key: 1 Target current
     2 Time Key: 1 Motor current (A) for different temperatures
2 Time

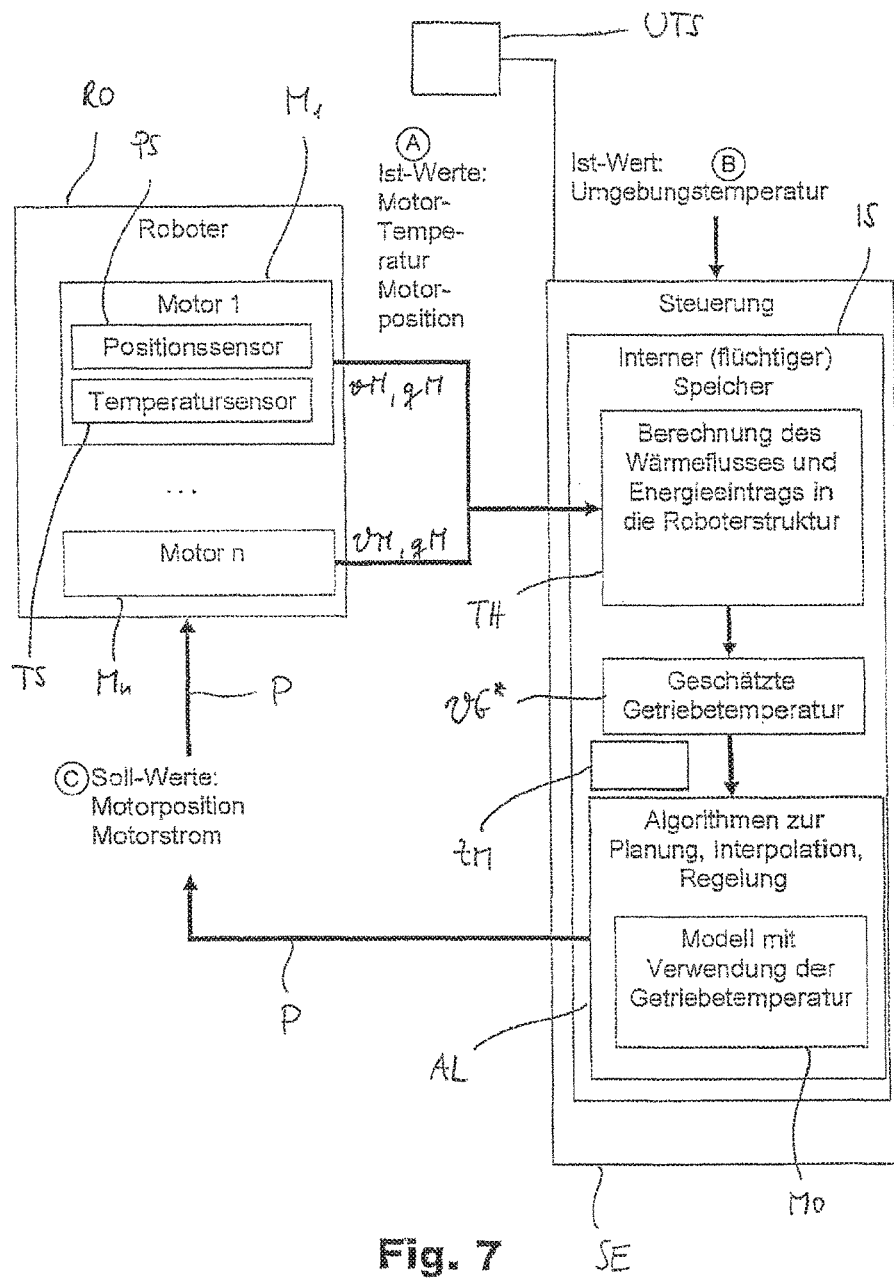

Fig. 7

Key: A   Actual values: motor temperature, motor position
B   Actual value: ambient temperature
C   Target values: motor position, motor current
RO  Robot
PS  Position sensor
TS  Temperature sensor
SE  Control unit
IS  Internal (volatile) memory
TH  Calculation of heat flow and energy input into the robot structure
ϑG* Estimated gear mechanism temperature
AL  Algorithms for planning, interpolation, adjustment
MO  Model using gear mechanism temperature

METHOD AND DEVICE FOR ADJUSTING AND CONTROLLING MANIPULATORS

The invention pertains to a method for adjusting and controlling an automatically controlled manipulator such as a robot, using a dynamic manipulator model taking into consideration friction torques that appear in gear mechanisms provided for moving axes of the manipulator, wherein a model for the gear mechanism's friction torques is determined for at least one axis on the basis of driven axis speeds and axis accelerations, and is used for the determination of target values such as a motor position or a motor current.

The invention further pertains to a device for adjusting and controlling an automatically controlled manipulator such as a robot, having a plurality of axes and a plurality of motors and gear mechanisms for the movement thereof, with a control unit that is constructed for using a dynamic manipulator model taking into account friction torques appearing in the gear mechanisms, wherein a model for a respective gear mechanism's friction torques is provided for at least one axis on the basis of driven axis speeds and axis accelerations and can be used by the control unit for determining target values such as a motor position or a motor current.

In addition to the above, the invention pertains to possible uses of a device according to the invention.

An automatically controlled manipulator is a manipulator with automatic control according to EN ISO 8373, a robot or industrial robot, likewise according to EN ISO 8373, particularly with three or more programmable axes.

Robot controllers of the previously known type ordinarily contain a dynamic model for (advance) planning, adjustment and interpolation of robot positions, or of movements between such positions. In the context of the above-mentioned model for the movement of the robot, the term "dynamic" refers to torques, forces, currents or the like. Such a dynamic model ordinarily also comprises a model for the frictional forces—in short, the friction—occurring in the movable part of the robot, particularly the gear mechanisms. For an explanation of the terms "planning," "adjusting" and "interpolation," the reader is referred to the description of FIG. 1 (see below). Optimally, it is also possible for a drive-side motor temperature of a motor associated with one of the axes in question to enter into the model as an input parameter.

First of all, the dynamic model is used for calculating, from programmed target values for loads, current position, speed and acceleration of the manipulator axes, the (target) torques at the motors and gear mechanisms provided for moving the axes. In this manner, it is possible for a time-optimized path, within the given physical limits, to be calculated by the control unit of the manipulator. Conversely, it is possible, from measured actual values for current, position, velocity, acceleration or the like, to calculate an estimate of the current motor and gear mechanism torques of the robot, which can subsequently be used for monitoring purposes, for instance, for recognizing collisions.

Another possibility for application of the dynamic model is the calculation of precontrol torques either in the interpolator or in the adjustment of the robot, which adjustment can be based on target and/or actual values.

It has also turned out in the past that the temperature conditions prevailing in or on motors and gear mechanisms have a great influence on the frictional effects (friction torques) contained in the dynamic models, and thus on the motor current that is necessary, for example, to move the axis by a certain movement measure against the frictional effects.

In order to counter these effects, worst-case estimates for temperature-dependent parameters are used in methods and devices of the type mentioned above. Thus, for instance, the gear mechanism's friction torque varies as a function of the ambient temperature and the respective movements of the robot. To be sure, a certain tolerable range for the ambient temperature is known from information provided by the gear mechanism manufacturer; however, a robot manufacturer cannot make precise assumptions regarding the actual gear mechanism temperature prevailing during use by the customer, and must therefore conservatively assume a maximum friction in the gear mechanism, which must be overcome by a corresponding motor torque. Since the assumed maximum torques are usually not present, however, motor torque remains unused and valuable cycle time of the robot is unnecessarily lost.

Another disadvantage of the only imprecisely known gear mechanism frictional torque is seen in the stopping of a robot motion since, after stopping, the friction is considerable in the subsequent start-up, and leads to a jerky motion of the gear mechanism due to static friction effects. Such effects additionally have a disadvantageous effect on the proper adjustment of the manipulators, since the torque is preserved in the case of static friction while at the same time there is no movement, so that the adjustment becomes disordered.

Corresponding disadvantages arise in the start-up of manipulators, particularly for So-called soft servo applications, in which the required initial breakaway torque for a motor to overcome the static friction cannot be precisely specified in a low velocity range.

To avoid the above disadvantages, the invention is based on the problem of determining the gear mechanism friction torque for robots more precisely, and of using this information to control the adjustment and movement behavior of the robot, and furthermore, enabling a better exploitation of the manipulator's available motor torque, together with a gain of cycle time due to an improved adjustment and movement behavior from an increased precision of model-based robot functions, such as time-optimal planning, collision recognition or load data detection.

The problem is solved for a method of the type described above by determining the gear mechanism's friction torque as a function of a gear mechanism temperature.

A device according to the invention for solving the aforementioned problem accordingly has at least one determination device, actively connected to the control unit, for a gear mechanism temperature, the output signal of which device can be analyzed in the control unit to determine the gear mechanism's friction torque.

It has been seen, for instance, that a difference of 30 to 40% between the target and actual torques of a motor can exist if the temperature is not taken into consideration in the dynamic model of the robot. Correspondingly, the inventive consideration of the gear mechanism temperature existing due to gear mechanism friction and of its entry into the structure as well makes a flexible adaptation and improvement of the adjustment and movement behavior of manipulators possible, since no restriction to the above-described "worst case" is necessary with the invention; in particular, the cycle times of the robot can thus be arranged more flexibly and quickly and lead to a gain of time.

A first refinement of the inventive method provides that gear mechanism temperatures are directly measured. In this connection, the temperature measurement can be performed during regular operation of the manipulator, i.e., at the premises of the customer/end user. Alternatively or additionally, it is provided that the measurement of the gear mechanism temperature is performed before initiation of regular operation of the manipulator, in which case this optionally need no longer be done during operation at the premises of the end user.

Corresponding refinements of the inventive device provide that the temperature determination unit is embodied as a temperature sensor that can be integrated into the gear mechanism and/or that the temperature-determination unit is constructed for measurement of the temperature of the gear mechanism fluid.

However, the provision of additional temperature sensors on the axes of the robots can be undesirable in series production, and not only for reasons of cost. Thus it is very difficult, in particular, to use sensors on the hand axes of a robot, since there are scarcely any possibilities for installation and cabling in this case. The objective of refinements of the present invention is therefore to allow at least an approximate determination of the gear mechanism temperature in the series product without using additional sensors, and to employ these—as mentioned above—for various control and adjustment processes.

Alternatively, it is therefore also possible within the scope of the present invention, even without a direct temperature measurement on the gear mechanism, to arrive at an approximate value for the gear mechanism temperature from the velocities traveled and the corresponding parameters of the manipulator, in conjunction with models for the heat conduction in the mechanical structure of the manipulator and, if appropriate, additionally for a heat radiation to the surroundings. For this, however, the measurement of the ambient temperature is necessary. A correspondingly designed invented method is distinguished in that:
  a) drive-side parameters of the manipulator, such as motor current, motor position or motor temperature, are determined at defined time intervals;
  b) a heat conduction in the mechanical structure and heat dissipation to the environment is determined in a regular cycle timing on the basis of a heat conduction model; and
  c) a gear mechanism temperature is determined approximately from the heat conduction.

In a correspondingly constructed inventive device, it can be provided for this purpose that a heat conduction model is available in control unit (SE), control unit (SE) being constructed for the determination of a heat conduction in the mechanical structure of manipulator (RO) in a regular cycle, so that a gear mechanism temperature ($\theta G$) can be determined approximately from the heat conduction.

The device is preferably refined such that
  a) a temperature unit (UTS) is provided for determination of an ambient temperature of manipulator (RO) at regular time intervals; that
  b) control unit (SE) is constructed for the determination of a heat radiation from manipulator (RO) to the environment on the basis of the ambient temperature in a regular cycle; and that
  c) a gear mechanism temperature ($\theta G$) can be determined approximately from the heat conduction and the heat radiation.

In contrast to a method or a device in which a robot has additional temperature sensors as standard equipment or is to be equipped at the gear mechanisms with additional gear mechanism sensors, the latter-mentioned embodiment has the advantage that only a small number of easily-mounted temperature sensors for the ambient temperature are necessary. However, the model formation for the heat radiation or heat conduction can prove difficult in individual cases.

A highly preferred refinement of the invented method additionally provides that, by means of a measurement of values of drive-side actual parameters of the manipulator, such as a motor current of a motor position, a characteristic diagram of the gear mechanism friction torque model, with which a value of the gear mechanism temperature or gear mechanism friction torque is determined as a function of the actual drive-side input parameters, is determined according to the gear mechanism temperatures detected by sensors. In this case it is also possible, in particular, for the characteristic diagram and the gear mechanism friction torque model to be determined before the start of regular operation of the manipulator and stored for later use.

According to the invention, therefore, a robot of the respective series can be equipped and measured one time with additional temperature sensors on the gear mechanisms, from which a characteristic diagram or a parametric model for gear mechanism temperature can be prepared, so that the latter can be derived during regular operation of the manipulator from other measured parameters, for which appropriate sensors on the manipulator are ordinarily available.

Accordingly, one refinement of a device of the invention contains a unit for determining a characteristic diagram of the gear mechanism friction torque model according to gear mechanism temperatures from values of drive-side actual values of the manipulator such as a motor current or a motor position, on the basis of which model a value for gear mechanism temperature or gear mechanism friction torque can be determined by the controller as a function of drive-side actual values. In addition, a device of the invention can have a first storage unit for the characteristic diagram and the gear mechanism friction torque model for later use by the control unit during ordinary operation of the manipulator.

According to the invention it is thus possible in three different ways to reach a value for the gear mechanism temperature, which can then be used in the friction model: 1) direct measurement during ordinary robot operation; 2) approximate determination on the basis of typically available actual values of the robot, or optionally, on the basis of a characteristic diagram; and/or 3) on the basis of a thermal model formation, optionally with measurement of the ambient temperature. Starting from the measured actual parameters, it is subsequently possible in methods 2) and 3), as already mentioned, to make the time variation of measured actual parameters coincide with the determined characteristic diagram or a parametric model optimally by varying the assumed gear mechanism temperature correspondingly. The corresponding implementations of the invented method are the subject matter of additional subordinate claims and will be described in detail below. According to the invention the optimal value for the gear mechanism temperature that has been found can then be used for additional purposes in the controller.

The notation listed below will be used to explain the above-discussed connections:
  qM: motor-side (=drive-side) position
  qG: gear mechanism side (=driven-side, axis-side) position
  $\theta M$: motor temperature
  $\theta G$: gear mechanism temperature
  $\tau M$: drive-side torque or motor torque
  $\tau G$: driven-side torque or gear mechanism torque I: motor current
R: gear mechanism transmission ratio; for nonelastic gear mechanisms qM=qG*R
τRG: friction torque associated with the gear mechanism
τRM: friction torque associated with the motor
J: load moment of inertia To distinguish between actual and target values, the notation listed above may be expanded with an index "soll" [target] or "ist" [actual].

Moreover, the explanation of the invention below refers to only one axis. It goes without saying, however, the invention can also be used for multi-axis manipulators with an arbitrary arrangement of rotatory and linear axes.

The following connections are assumed for the friction torques:

$$\tau RG = \tau RG(d/dt\ qG, d/dt^2 qG, \vartheta G, \tau G). \tag{1}$$

According to the above, the friction torque at the gear mechanism is function of axis speed, axis acceleration, gear mechanism temperature and load torque. Since the gear mechanism temperature cannot usually be measured directly during operation of the robot, as was explained above, this friction torque is the most difficult to describe.

The following functional connection exists for the friction torque at the motor:

$$\tau RM = \tau RM(d/dt\ qM, d/dt^2 qM, \vartheta M), \tag{2}$$

in the form of a function of motor speed, motor acceleration and motor temperature.

One concrete example for the friction torque at the gear mechanism is $$\tau RG = \tau RG(d/dtqG, d/dt^2 qG, \vartheta G, \tau G) \tag{3}$$
$$= a1(\vartheta G) \cdot \sin(d/dtqG) + a2(\vartheta G) \cdot$$
$$d/dtqG + a3(\vartheta G) \cdot d/dt^2 qG$$

Accordingly, the gear mechanism friction is composed of three different friction terms, namely
  a static friction term (solid-body friction): $a1(\theta G) \cdot \text{sign}(d/dt\ qG)$ with temperature-dependent coefficient a1;
  a sliding friction term (viscous friction): $a2(\theta G) \cdot d/dt\ qG$ with temperature-dependent coefficient a2; and
  a hysteresis loss term: $a3(\theta G) \cdot d/dt^2\ qG$ with temperature-dependent coefficient a3.

According to the state of the art, both simple models (e.g., without a hysteresis loss term) and more complex models are possible (see, e.g., Olsson, Åström, C. Canudas, de Wit, M. Gäfvert, P. Lischinsky: Friction Models and Friction Compensation, European Journal of Control, 29(4), 1998, pp. 176-195).

With the assumption of a rigid joint without gear mechanism elasticities and linear motor characteristic with current, expressed as $\tau M = k_T \cdot I$, it holds independently of the friction model that $$\tau G = (I \cdot kr - \tau RM) \cdot R - \tau RG, \tag{4}$$

i.e., the gear mechanism torque corresponds to the difference of motor torque and motor friction torque multiplied by the gear mechanism transmission ratio, wherein subsequently the gear mechanism friction torque must be subtracted.

According to the state of the art, robot controllers either use completely temperature-independent friction torques in the form, for instance, of $$\tau RG(d/dtqG, d/dt^2 qG, \vartheta G, \tau G) = \tag{5}$$
$$a1 \cdot \text{sign}(d/dtqG) + a2 \cdot d/dtqG + a3 \cdot d/dt^2 qG$$

or models in which the motor temperature enters in as an estimate of the gear mechanism temperature:

$$\tau RG(d/dtqG, d/dt^2 q, \vartheta M, \vartheta G, \tau G) = \tag{6}$$
$$a1(\vartheta M) \cdot \text{sign}(d/dtqG) + a2(\vartheta M) \cdot d/dtqG + a3(\vartheta M) \cdot d/dt^2 qG$$

However, the use of motor temperature as a simple estimated value for gear mechanism temperature is impermissible as a rule, as can easily be illustrated on the basis of a stationary axis under the influence of gravity. In order to keep a load in position under gravitational influence, a corresponding motor must exert a certain force, with electrical energy being input into the motor and heating it up. The load and the gear mechanism are stationary in this case, so that no speed-dependent friction accumulates during a movement, which is the main reason for the heating up of a gear mechanism. Still, the heat produced at the motor is considerable, so that it would overheat. In practice, therefore, motor-side brakes stop the robot as soon as it has not moved over a duration of ca. 30 sec or more.

Building upon this, the invention is based on the central idea, as already mentioned above, that the robot manufacturer prepares a characteristic diagram for the temperature-dependent gear mechanism friction model on the basis of one or more robots specially equipped with temperature sensors in the gear mechanism, in order thereby to be able to forgo the disadvantageously expensive installation of temperature sensors in the gear mechanism of the robot on a series-production basis. Series-produced robots then use this characteristic diagram in their controllers to determine a gear mechanism temperature approximately via an optimization method from a temperature curve of measured actual parameters as already available in the state of the art, i.e., the motor current and/or the motor position, with a plausible assumption of a gear mechanism temperature that varies only slowly relative to the movement times of the robot, and then to use the temperature for control, adjustment or monitoring purposes.

With a robot thus equipped, appropriate measurement runs are performed, which cover the entire range of the input parameters of the friction model. The actual values for position and the speed determined therefrom, the motor temperature and the gear mechanism temperature are ascertained cyclically during these measurement runs, the sampling rate typically lying in the range of a millisecond, and are stored in an external memory. Thereafter, the friction model τRM or τRG is determined according to equations 1 and 2, and is stored in the external memory either in the form of a table or a parameterized model. The corresponding parameters can likewise be determined from the measurements by a least-squares method, for instance.

The storage of the aforementioned actual values, as well as the calculation steps necessary for setting up the model are preferably performed by a computational unit of the control unit of the robot itself. It is also possible, however, for the aforementioned process steps to be run on a separate external computer.

According to the invention, the result of the above-described (offline) preliminary work is a gear mechanism friction model τRG as a function of the various parameters of influence, explicitly including, according to the essence of the invention, the gear mechanism temperature θG:

$$\tau RG(qG, d/dt\, qG, d/dt^2 qG, \vartheta G, K), \qquad (7)$$

where the later parameters of influence are indicated by the items in equation 7.

According to the present invention, the above-explained friction model will subsequently be used "online," i.e., in operation of the controller or robot to improve the control and adjustment behavior. In principle, it is also possible, of course, to equip the robot during its ordinary operation with additional temperature sensors in or on the gear mechanisms, and thus measure gear mechanism temperature θG directly via sensors in, for instance, the gear mechanism fluid. Then the friction torques and their effect on the movement behavior can be determined very precisely via the friction model that has been prepared according to the invention. A corresponding refinement of the invented method thus provides that, in case of advance planning of a series of varying manipulator positions, particularly with regard to geometry, time variation and velocities of a movement, the values of target parameters such as a motor current or motor position that appear can be determined using the gear mechanism temperature. Within the scope of the invention, the term "(advance) planning" refers to the geometry and time variation of varying robot positions, meaning, in particular, planning of speed. According to the invention, the planning can be performed in a time-optimized manner by fixing the actual temperatures $\theta M_{ist}$ and $\theta G_{ist}$ at the beginning of the planning of each set of movements or the like. The torques that occur are determined using these temperatures Following an especially preferred refinement of the invented method, it can be additionally provided that there is replanning before the start of an interpolation of a given position sequence if a time exceeding a predetermined time threshold has elapsed between the advance planning and the interpolation, the term "interpolation" including the sensing of positions and the interpolation between them. Thus, if there is an interruption between the planning and the interpolation of a set that is so long that a cooling-down of the motors and gear mechanisms can be expected, then there is also a new planning before a subsequent new start.

Refinements of the invented method additionally provide that, in an interpolation of manipulator positions and/or an adjustment, the values of target parameters, such as motor current or motor position, that occur are determined using the gear mechanism temperature. According to the invention, therefore, the (precontrol) torques in both the interpolation and the adjustment can be calculated using the current actual temperatures.

A device according to the invention for performing the invented method can be distinguished, in particular, by a time-measuring unit which, in the advance planning by a controller of a sequence of varying manipulator positions, particularly relative to the geometry, the time variation and the speeds of a movement, is designed to bring about replanning if a time elapsed between the advance planning and an interpolation of the movement sequence exceeds a predetermined time threshold.

For reasons of cost, a particular concern of the present invention, however, is to take the gear mechanism temperature into account, even without direct measurement of this temperature, during the ordinary operation of robots in order to be able to forgo an additional placement of series-production temperature sensors for the gear mechanism. Temperature sensors are still present in the motors of the robot so that, within the scope of the invention, actual values of the following parameters of influence can be detected at regular intervals during operation of the robot:

motor position $qM_{ist}$ and, derived therefrom, motor speed $d/dt\, qM_{ist}$ and motor acceleration $d/dt^2\, qM_{ist}$ axis position $qG_{ist}$, axis speed $d/dt\, qG_{ist}$ and axis acceleration $d/dt^2\, qG_{ist}$ by conversion from motor-side values (gear mechanism transmission ratio, possibly taking gear mechanism elasticity into account; see equation 4 above)

motor current $I_{ist}$ motor temperature $\theta M_{ist}$.

It will be assumed below in this case that gear mechanism temperature θG is not directly measurable for lack of additional sensors.

It will be further assumed below that the friction torque depends continuously on the temperature, and that the temperatures of motors and gear mechanisms change slowly in comparison to the cycle time of a (robot) controller. The latter assumption is justified since experience shows that, with an ambient temperature of roughly 20° C., a robot takes at least 30 min to reach the maximum temperatures of 120° at the motors and 70° C. at the gear mechanisms. Accordingly the aforesaid temperature changes by less than 0.05° C. within a movement set having a typical duration of less than 1 sec.

Let the beginning of the invented method be designated as t_act=0 with regard to its time point, it being assumed that either the non-measurable gear mechanism temperature and the non-measurable ambient temperature coincide after the motors have been turned off for a relatively long time, or that the gear mechanism temperature can be approximately determined after a shorter stoppage via the stoppage time in a simple heat flow model in the robot structure. If no approximately correct starting time is available, a meaningful temperature estimate can be achieved as a rule with the optimization described further below.

On this basis, an advantageous refinement of the invented method provides that drive-side actual parameters of the manipulators, such as a motor current or a motor position, are determined more or less continually during regular time intervals, and their values are stored during a predetermined time period, with the storing time duration being small to a first approximation in comparison to a time scale for changes of the gear mechanism temperature (that is, the gear mechanism temperature is approximately constant during the storage time period), and that there is an approximate determination of the gear mechanism temperature during the cycle time of a predetermined time interval, the stored values of the actual parameters at the time of the determination being used for the determination. The storage time period and the determination time interval are preferably selected to be on the same order of magnitude.

Corresponding refinements of a device according to the invention are distinguished by a second storage device that is constructed for virtually continuous storage of actual drive-side parameter values of the manipulator, such as those of a motor current or a motor position at regular intervals, and for holding the values during a predetermined time period, the time period being relatively small relative to a time scale for changes of gear mechanism temperature. The storage time period here advantageously amounts to 0.1 to 1 sec, preferably roughly 0.5 sec.

According to a particularly preferred configuration of the device according to the invention, the second storage device is constructed as a circular buffer. Moreover, the control unit can be constructed for the approximate determination of the gear mechanism temperature with a cycle timing of a predetermined time interval, with the values stored in the storage device at that time point being evaluable for the determination. The storage time period and the determination time interval are preferably of the same order of magnitude.

According to the invention, therefore, an observation time period T is established (preferably with a length T=0.5 see), the time duration of which is "small" in comparison to the time scale on which the temperature of the robot (the motors and gear mechanisms) changes, as was already explained above. Marked temperature changes can only be recognized in the minute range. However, the observation time period T is "large" in comparison to a time scale of the adjustment, since the adjustment cycle time of modern robots lies in the range of only a few milliseconds. During this short cycle time, the control unit is capable of detecting position data and temperature virtually continuously.

The measurable values $d/dt\ qM$, $d/dt^2\ qM$ and $\theta M$ are preferably placed in a circular buffer that stores the signal sequence of these parameters within a time T, i.e., for the duration thereof, until the current time T_act, that is to say, the storage takes place and remains within a time period of length T: [t_act−T, t_act].

In the cycle time of a freely definable time interval $\Delta T$, a new estimate of the gear mechanism temperature is calculated on the basis of the previously prepared model, the smallest possible meaningful selection for the time interval $\Delta T$ being the adjustment cycle time of the robot controller. Advantageously, however, $\Delta T$ and T are of the same order of magnitude, since the below-described optimization algorithm is expensive to calculate in terms of time, so that a process sequence with a time interval $\Delta T$ on the order of magnitude of the adjustment time cycle would scarcely be executable according to the current state of the art. On the other hand, the temperature changes only slowly, so that, as already stated, an evaluation with $\Delta t$ 1 sec is sufficient.

There exists the following formal relationship between motor torque, friction torque and gear mechanism torques:

$$\tau G = (\tau M - \tau RM) \cdot R - \tau RG, \quad (8)$$

which is equivalent to equation 4 above. After further rewriting we have $$I = (1/kr) \cdot ((1/R) \cdot (\tau G, + \tau RG) + \tau RM). \quad (9)$$

Thus, if values for the arguments of the friction model, $\tau RG$ and $\tau RM$, are available, a motor current can be calculated. Because $$\tau RG = \tau RG(qG, d/dt\ qG, d/dt^2 qG, \vartheta\ G)$$

$$\tau G = \tau G(qG, d/dt\ qG, d/dt^2 qG, J) \quad (10)$$

$$\tau RM = \tau RM(qM, d/dt\ qM, d/dt^2 qM, \vartheta M, k) \quad (11)$$

it is possible, with known values $$qG, d/dt\ qG, d/dt^2 qG, \vartheta\ G, J, qM, d/dt\ qM, d/dt^2 qM, \vartheta M$$

of equation 9, for the target current to be calculated. Among the values listed, however, the only ones that are regularly measurable are the motor position qM and its derivatives, the gear mechanism position qG and its derivatives, the motor temperature $\theta M$ and the actual motor torque or motor current. For the unknown gear mechanism temperature $\theta G$, a variable of the same name is introduced according to the invention, and is inserted into the above-described gear mechanism friction torque model. With each hypothetical value of $\theta G$, it is then possible, according to the invention, to associate the gear mechanism friction torque $\tau RG$ or the current at this temperature value that can be ascertained via equation 9.

For this purpose, the invented method is distinguished in a preferred refinement in that the determination of the gear mechanism temperature is done by minimizing the value of an expression $$\int_{t\_act-T}^{t\_act} |I_{soll}(\vartheta G; d/dt qG(t), d/dt^2 qG(t), \partial M(t), \tau G(t)) - I_{ist}(t)|^2 \quad (12)$$

$$w(t)dt = \int_{t\_act-T}^{t\_act}$$

$$|\tau M_{soll}(\vartheta G; d/dt qG(t), d/dt^2 qG(t), \partial M(t), \tau G(t))/kr - I_{ist}(t)|^2$$

$$w(t)dt =$$

$$\int_{t\_act-T}^{t\_act} \left| \frac{((\tau G + \tau RG)/R - \tau RM)_{soll} \times \times}{(\vartheta G; d/dt qG(t), d/dt^2 qG(t), \partial M(t), \tau G(t))/kr - I_{ist}(t)} \right|^2$$

$$w(t)dt$$

for $\theta G$, where t designates the time coordinate,
t_act a current time point,
T the storage time period,
$I_{soll}$ a target motor current,
$\theta G$ the gear mechanism temperature to be determined,
qG(t) a time-dependent driven-side position
$\theta M(t)$ the time-dependent motor temperature,
$\tau G(t)$ a time-dependent driven-side torque,
$I_{ist}(t)$ a time-dependent actual motor current,
w(t) a time-dependent weighting function,
$\tau M_{soll}$ a drive-side target torque,
$k_T$ a proportionality factor according to $\tau M = k_T I$,
d/dt qG(t) the first derivative with respect to time of the driven-side position, i.e., a driven-side velocity,
$d/dt^2$ qG(t) the second derivative with respect to time of the driven-side position, i.e., a driven-side acceleration.

A particular advantage of this method is that the gear mechanism temperature enters into the determination of the gear mechanism torque for controlling and adjusting the robot without the necessity for additional approximate assumptions regarding its origin, due for instance to heat flows or the like.

The above-listed minimization problem thus supplies the gear mechanism temperature with which a signal sequence of the measured actual parameters can be best explained. The integral in equation 12 can be evaluated in a computational unit of the control unit with quadratic formulas, i.e., weighted sums, into which the actual values measured at finitely many fixed points of time during the time interval [t_act−T, t_act] enter, which are preferably stored, as already mentioned, in a circular buffer.

The estimated temperature at which the integral takes on its minimum value is used as the new gear mechanism temperature for the current time point t_act.

The above-described optimization is performed numerically. In order to obtain an acceptable starting value for the numerical optimization, a refinement of the invented method is distinguished in that a most recently determined value of the gear mechanism temperature is for the minimization of the expression. An initialization following a cold start of the controller can take place at an average ambient temperature specified by the manufacturer. The term w(t) in equation 12 represents a weighting factor, with the concrete embodiment of which, for instance, the more remote past can be weighted more weakly. It is also possible, however, to use a constant weighting function w=1. It is additionally possible to use a norm for weighting the difference of the target and actual current signals that is completely different from the weighted L2 norm shown in equation 12.

If the minimization of the integral in equation 12 does not yield an unambiguous result, then an arbitrary value θG at which the integral takes on its minimum value can be used. In this case the temperature has a uniform effect over a wide range on the friction, which is ultimately the control parameter that is really relevant to the control system, for which temperature is, strictly speaking, only an auxiliary parameter for the determination.

As already described above, the weighted gear mechanism temperature is made available according to the invention to all planning, interpolation and adjustment processes, so that current and position specifications for the motors of the robot can be determined as a function of the estimated gear mechanism temperature.

According to an alternative design of the invented method, it is provided that the determination of the gear mechanism temperature is performed by minimizing the value of an expression $$|\tau M_{soll}(\vartheta G; d/dt\ qG(t), d/dt^2 qG(t), \vartheta M(t), \tau G(t)) - \tau M_{ist}(t)|^2 \quad (13)$$

where again t designates the time coordinate,
θG the gear mechanism temperature to be determined,
qG(t) a time-dependent driven-side position
θM(t) the time-dependent motor temperature,
τG(t) a time-dependent driven-side torque,
$I_{ist}(t)$ a time-dependent actual motor current,
$\tau M_{soll}$ a drive-side target torque,
$\tau M_{ist}$ a drive-side actual torque,
d/dt qG(t) the first derivative with respect to time of the driven-side position, i.e., a driven-side velocity,
$d/dt^2$ qG(t) the second derivative with respect to time of the driven-side position, i.e., a driven-side acceleration.

In particular, a second memory in the form of a circular buffer is not necessary in this manner, since the optimization is done only locally, with information regarding an actual position of the manipulator flowing into the method only at certain points. In other words, only the respective actual situation is optimized, rather than an integral over a past time period.

Corresponding to the discussion above, the value of the most recently performed temperature estimation is again suitable as a starting value for the likewise numerical optimization of the expression according to equation 13. In order to achieve an acceptable result for the temperature estimation, despite the merely local optimization, the incoming input signals in equation 13 must perhaps be smoothed or filtered.

In contrast to the optimization with a moving time window described above, equation 13 provides a considerably simpler determination of the minimization criterion for estimating the gear mechanism temperature. In this case, it may be necessary to tolerate an oscillation of the estimated temperature values.

Additional details and advantages of the invention result from the description below of embodiments on the basis of the drawings. Shown are FIG. 1, a flow diagram relating to planning, interpolation and adjustment in a robot controller;

FIGS. 2a-d, the dependency of the gear mechanism torque τG on the (driven-side) velocity d/dt q;

FIG. 3, a block diagram relating to the data flow in the inventive offline measurements for setting up a friction model;

FIG. 4, a block/flow diagram relating to the invented method with gear mechanism temperature sensors;

FIG. 5, a representation corresponding to FIG. 4, but without temperature sensors in the gear mechanisms;

FIGS. 6a-e graphical representations of various time-variable robot-specific parameters for determining the gear mechanism temperature; and FIG. 7, a block/flow diagram relating to the data flow for the measurement of an ambient temperature.

FIG. 1 serves to explain the meaning of the repeatedly used terms "planning," "interpolation" and "adjustment" within the context of the present method, on the basis of a simplified flow diagram.

An interpreter/compiler IC, which is regularly present in the controller of a robot, in particular, an industrial robot, is constructed to convert the programmed movements of the manipulator (program movements), manual movements or interrupt movements into a movement plan for the robot, where planning means, as already stated, is understood to mean (advance) planning of varying robot positions with respect to geometry and time progression, particularly movement planning. Such movement planning takes place according to FIG. 1 in a step BP and supplies a geometrical path and a velocity profile for a movement of the manipulator. Subsequently there is an interpolation IP of the determined robot positions, which is understood to mean a sensing of the positions. The interpolation IP results in values for the axis angles of the manipulator and corresponding current specifications for its drives, which can be used according to FIG. 1 via a drive interface AS for control, adjustment and monitoring purposes in the adjustment unit RE of the manipulator. "Adjustment" of a robot is understood according to its general definition as a process in which a (control) parameter is continuously detected, compared to another parameter (guide parameter) and is influenced in the sense of an adaptation to the guide parameter.

As already mentioned, the invented method for improving the adjustment and running behavior of a manipulator can be used both in the field of movement planning BP, interpolation IP, as well as in that of adjustment RE.

This is successful according to the invention by means of improved modeling of the friction with regard to its temperature behavior. FIGS. 2a-d schematically show the approaches of different friction models. In each case, the driven-side torque τG (gear mechanism torque) is shown versus the time variation of position q, i.e., an axis speed d/dt q. The gear mechanism torque τG is linked to a motor torque τM via the gear mechanism transmission ratio and the friction, cf. equation 4. In FIG. 2[a], the model of a Coulomb friction is represented. In FIG. 2b, the same model with additional viscous friction is shown, in which the gear mechanism torque τG increases with increasing magnitude of the axis velocity. FIG. 2c shows a model in which an increased breakaway torque at d/dt q=0 is necessary due to static friction. FIG. 2d shows a variation of the case in 2c (figures according to H. Olsson, K. J. Åström, C. Canudas, de Wit, M. Gäfvert, P. Lischinsky: Friction Models and Friction Compensation, European Journal of Control 29(4), 1998, pp. 176-195).

In order to take temperature influences into account within the framework of the friction models on which FIGS. 2a-2d are based, the invention proposes first of all the method shown schematically in FIG. 3, or a correspondingly constructed device. Shown on the basis of a block schematic diagram is an automatically controlled manipulator or robot RO that has, for the movement of its axes (not shown), a series of motors M1, . . . , Mn, with which corresponding gear mechanisms G1, . . . , Gn are associated. For motors M1, . . . , Mn, robot RO of FIG. 3 additionally has position and temperature sensors PS or TS, respectively, which are shown in FIG. 3 explicitly only for motor M1 for reasons of clarity. For measurement purposes, robot RO also has gear mechanism temperature sensors GTS1, . . . , GTSn, which need not be provided for the corresponding robot in series production. To illustrate this, gear mechanism temperature sensors GTS1, . . . , GTSn are shown in FIG. 3 outside of robot RO, and are actively connected to the respective gear mechanism G1, . . . , Gn via connections drawn in dashed lines.

Position sensors PS of the motors can be constructed as transmitters, resolvers or the like.

Gear mechanism temperature sensors GTS1, . . . , GTSn are preferably designed and arranged so that they can determine the gear mechanism oil temperature of gear mechanisms G1, . . . , Gn.

According to FIG. 3, a control unit SE is additionally provided for controlling robot RO. It can be constructed, for instance, as a control computer in the form of a PC, and according to the invention comprises at least one internal memory IS for an operating system and a control core BS, as well as for required application programs AP. In addition, control unit SE has an external storage medium ES in the form, for instance, of a hard disk drive that serves, according to FIG. 3, for the storage of measurement data MD and models MO, in particular, friction models for robot RO.

According to the invented method, robot RO supplies information regarding motor temperatures and motor positions via its sensors to control unit SE (thick arrow in FIG. 3). Gear mechanism temperature sensors GTS1, . . . , GTSn additionally supply information regarding the respective gear mechanism temperatures prevailing in gear mechanisms G1, . . . , Gn to control unit SE, which in turn supplies position and current specifications to robot RO.

The application program AP advantageously contain programs for measurement runs, by means of which control unit SE causes robot RO to carry out movements that cover the entire range of input parameters for the friction model in use (cf. equation 7). The detected actual values for position, motor temperature and gear mechanism temperature are ascertained cyclically during these measurement runs and stored in a file (measurement data MD) in external storage device ES. From measured data MD after termination of the measurement runs, either control unit SE or optionally a different, external computer (not shown) can prepare a temperature-dependent gear mechanism friction model MO for robot RO, which remains permanently in external storage device ES and thus can be subsequently used, even during ordinary operation of robot RO without sensors, for determining a gear mechanism temperature or a gear mechanism friction by comparison to the motor temperatures and motor positions, which can be determined on a regular basis.

In the simplest case, however, an invented robot according to FIG. 4 is equipped permanently, i.e., even during ordinary operation, with temperature sensors GTS1, . . . , GTSn that measure the respective gear mechanism temperature θG directly by way of sensors in the gear mechanism oil.

In its external storage device ES, control unit SE required for ordinary operation of robot RO contains, alongside model MO using gear mechanism temperature θG, corresponding algorithms AL for planning, interpolation and adjustment of movements or movement states of robot RO (cf. FIG. 1). The currently measured gear mechanism temperature $\theta G_{ist}$ is then used in all planning, interpolation and adjustment routines of control device SE and influences the target specifications of position and current (arrow P in FIG. 4). Thus the respective actual temperatures $\theta M_{ist}$ and $\theta G_{ist}$ are fixed in the (time-optimal) planning at the start of the planning of each set, and the torques that occur are determined using these temperatures. In addition, control unit SE preferably also has a time measurement unit ZM, according to which new planning is performed if an interruption occurs between planning and interpolation of a set (see FIG. 1) that lasts sufficiently long that a cooling of the motors and gear mechanisms must be expected. The corresponding time threshold can be specified appropriately by the user.

In addition to the planning, the corresponding (precontrol) torques are calculated for interpolation and adjustment by using the current actual temperatures.

Particularly for reasons of cost, it can be desirable to forgo a direct measurement of the gear mechanism temperature during ordinary operation of the robot, while retaining the basic idea of the invention as previously. This state of affairs is illustrated in the subsequent FIG. 5. The robot RO provided for ordinary operation that is shown there comprises only temperature sensors TS in motors M1, . . . , Mn, but no gear mechanism temperature sensors.

According to a preferred configuration of the invention, control unit SE now comprises a circular buffer RP as a storage unit for the actual-value measurement data relating to a motor position and a motor temperature qM and θM, respectively, in its internal memory IS shown in FIG. 5, in addition to operating system and program components BS and AP, respectively, which are not shown again for reasons of clarity (cf. FIG. 4). Control unit SE further contains an optimizer OP, which is preferably implemented in software and is inherently intended for the solution of the above-formulated optimization problem. Corresponding to the implementation of FIG. 4, control unit SE again contains planning, interpolation and adjustment algorithms AL as well as model MO of robot RO making use of the gear mechanism temperature.

According to the invented method, optimizer OP supplies, by numerical solution of a temporally extended or a temporally local optimization problem (Equation 12 or 13, respectively), an estimated gear mechanism temperature θG*, which is subsequently provided to model MO, and with which corresponding, temperature-dependent target values for motor positions qM and motor currents I are supplied by means of algorithm AL to robot RO.

Figure 6A:
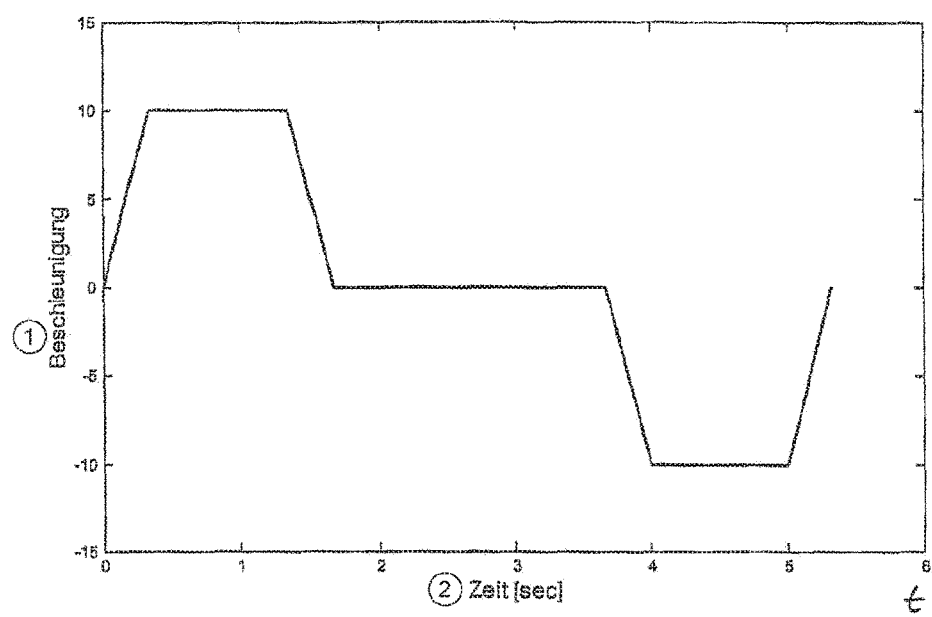
Figure 6B:
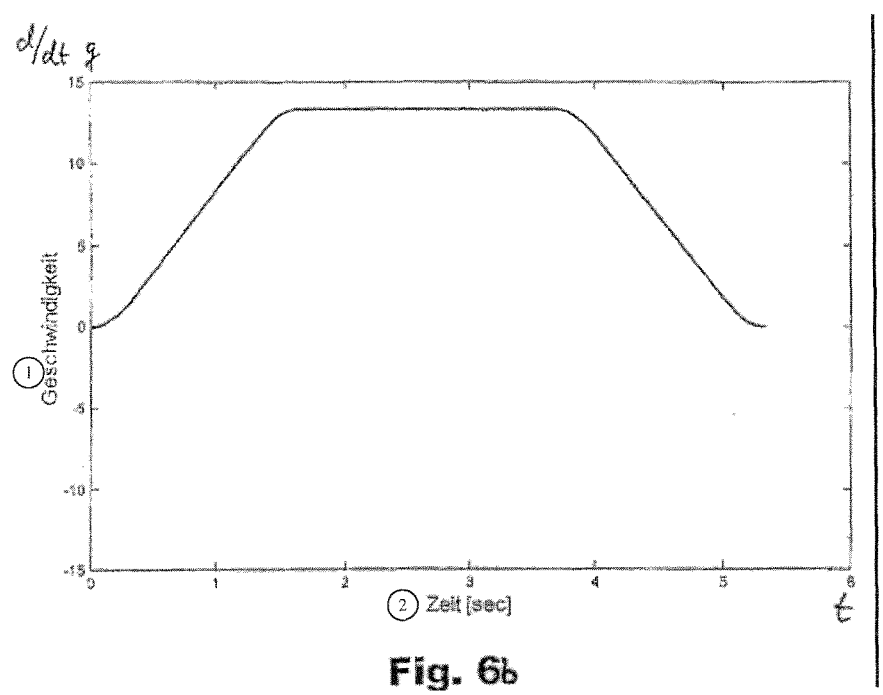

The fundamentals of the algorithms used according to the invention were already explained in detail above. In addition, the determination of gear mechanism temperature θG (or estimated gear mechanism temperature θG*) can be illustrated on the basis of FIGS. 6a-e as follows. First, an (axis) acceleration $d/dt^2$ q is shown in FIG. 6a as a unitless variable over time t. The time curve resulting from this hypothetical acceleration is shown by FIG. 6b in a representation of d/dt q with respect to t. The corresponding actual current I(t) can be measured, and is illustrated in FIG. 6c as a noisy signal. According to the invention, the signal curve of FIG. 6c is preferably recorded over a time period [t_act−T, t_act], and is stored in circular buffer RP of FIG. 5.

For each hypothetical value θG, a current curve I can be calculated (cf. equation 9) from the parameters qG, d/dt qG, $d/dt^2$ qG, qM, $d/dt$ qM, $d/dt^2$ qM, θM measured over time period [t_act-Y, t_act] (and stored), together with θG. The result of such a calculation is a bundle of curves, parameterized in $_θ$G, for the current variation $I_{θG}$. Such a curve bundle is illustrated in FIG. 6e, while FIG. 6d shows the target current $I_{soll}$ for the actual (correct) friction temperature (gear mechanism temperature).

For the optimal variation of the assumed/estimated gear mechanism temperature θG*, this current $I_{θG}$ (cf. FIG. 6e) is brought, according to the invention, into optimal coincidence with actual current list whereupon the determined optimal value for the gear mechanism temperature is set as the "genuine" gear mechanism temperature for the friction model. In the context of the invention, the term "optimal" is typically defined to mean the smallest quadratic distance between the calculated motor current $I_{θG}$ and the measured motor current $I_{ist}$, so that the invented calculation method according to equation 12 or 13 is solved by a generally nonlinear least squares method in a robot control unit analogous to the illustrated control unit SE (cf. FIGS. 3-5). This is described in principle in Charles Lawson and Richard Hanson: Solving Least Squares Problems, Prentice-Hall, 1974, revised edition, SIAM 1995, as well as in P. Deuflhard: Newton Methods for Nonlinear Problems: Affine Invariance and Adaptive Algorithms, Computational Mathematics Series 35, Springer (2004).

Figure 6E:
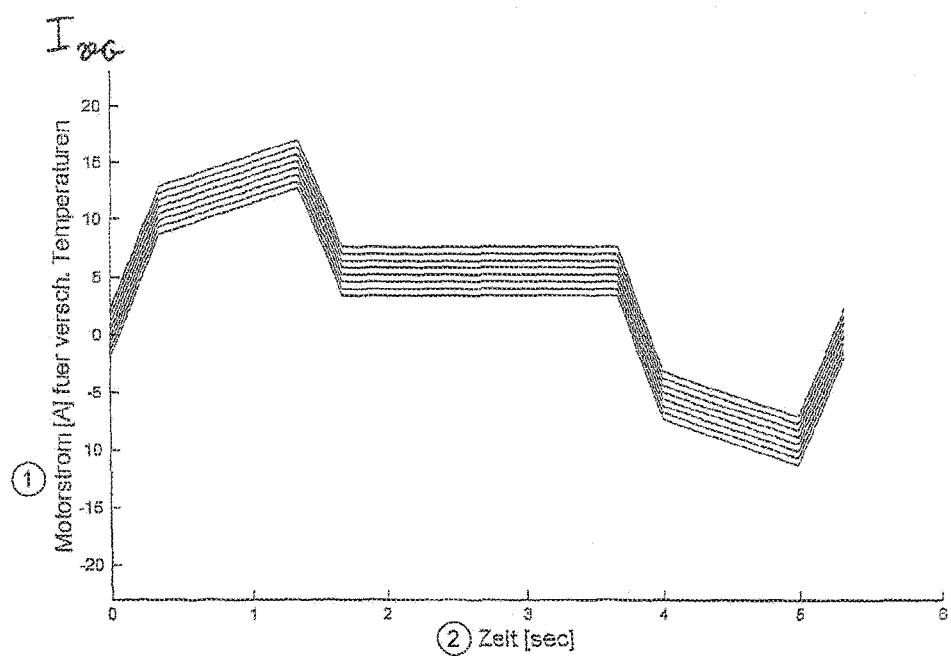

The representation in FIG. 6e is based on an (artificial) friction model of the form $$\tau RG = \tau RG(qG, d/dtqG, d/dt^2qG, \vartheta G) \qquad (14)$$
$$= C_1 \cdot d/dtqG + C_2 \cdot \vartheta G$$

($C_1$, $C_2$ constant). Since temperature θG enters additively into this model, the torque line, as shown in FIG. 6e, is only pushed up and down in case of a variation of θG.

Finally, FIG. 7 shows another configuration of the invented method or the invented device, in which no gear mechanism temperature sensors are used on robot RO, corresponding to the illustration in FIG. 5.

In this case, the invented device has an ambient temperature sensor UTS that is actively connected to control unit SE and via which the ambient temperature of robot RO can be supplied to control unit SE. In its internal memory IS, control unit SE accordingly has means TH for calculating the heat and energy input into robot structure (all structures including gear mechanisms), wherein the measured actual value of the ambient temperature also enters into the calculation. The above-mentioned calculation means TH are preferably implemented in software, and supply an estimated value θG* for the gear mechanism temperature as a function of the speeds traveled and corresponding parameters, using models for heat conduction in the mechanical structure of robot RO and for heat radiation to the environment.

The thick arrows in FIG. 7 show how, during the ordinary operation of robot RO, data regarding motor positions qM and motor temperatures θM are first cyclically sent from the drives of robot RO to control unit SE. Additionally, the ambient temperature is read by control unit SE via sensor UTS, as already mentioned. At a given cycle timing, a model calculation (calculation means TH) is subsequently called up, which estimates the current gear mechanism temperature θG on the basis of the measured data of the robot and the ambient temperature via a heat flow model. The estimated gear mechanism temperature θG* is them made available to all planning, interpolation and adjustment processes, analogously to the above-described invented method. As a function of the estimated gear mechanism temperature θG*, current and position specifications are sent to robot RO (arrow P in FIG. 7).

Accordingly, a target temperature can be calculated with this method variant from the target parameters via the energy input in the system.

LIST OF REFERENCE CHARACTERS

AL Algorithms
AP Application programs
AS Drive interface
BP Movement planning
BS Operating system/controller core
ES External storage device
G1, . . . ,Gn Gear mechanisms
GTS1, . . . , GTSn Gear mechanism temperature sensors
IC Interpreter/compiler
IP Interpolation
IS Internal memory
MD Measurement data
MO Model
M1, . . . ,Mn Motor
OP Optimizer
PS Position sensor
RE Adjustment
RO Robot
RP Circular buffer
SE Control unit
TH Heat flow calculation means
TS Temperature sensor
UTS Ambient temperature sensor
ZM Time measurement unit
θG* Estimated gear mechanism temperature
$k_T$ Time-dependent proportionality factor between motor current and motor torque

The invention claimed is:

1. A method of adjusting or controlling an automatically controlled robotic manipulator having shafts driven by motors and associated gear mechanisms, the method comprising:
   determining a gear mechanism friction torque as a function of gear mechanism temperature;
   determining a target value for at least one of a motor position or a motor current associated with at least one shaft of the robotic manipulator using a dynamic manipulator model that accounts for friction torques in the gear mechanisms, the model including a gear mechanism friction torque model for the at least one shaft based on driven-side shaft velocities and shaft accelerations; and
   actuating at least one motor of the robotic manipulator with a controller based on the determined target value.

2. The method of claim 1, further comprising:
   directly measuring the gear mechanism temperature.

3. The method of claim 2, wherein measuring the gear mechanism temperature comprises measuring the temperature during operation of the manipulator.

4. The method of claim 2, wherein measuring the gear mechanism temperature comprises measuring the temperature before operation of the manipulator.

5. The method of claim 4, wherein determination of the gear mechanism temperature comprises minimizing the following expression relative to θG:

$$\int_{t\_act-T}^{t\_act} \left| I_{soll}(\vartheta G; d/dt qG(t), d/dt^2 qG(t), \vartheta M(t), \tau G(t)) - I_{ist}(t) \right|^2 w(t) dt =$$

$$\int_{t\_act-T}^{t\_act} \left| \tau M_{soll}(\vartheta G; d/dt qG(t), d/dt^2 qG(t), \vartheta M(t), \tau G(t))/k_T - I_{ist}(t) \right|^2 w(t) dt =$$

$$\int_{t\_act-T}^{t\_act} \left| \frac{((\tau G + \tau RG)/R - \tau RM)_{soll} \times}{(\vartheta G; d/dt qG(t), d/dt^2 qG(t), \vartheta M(t), \tau G(t))/k_T - I_{ist}(t)} \right|^2 w(t) dt$$

wherein:
t designates the time coordinate
t_act is a current time point
T is the storage time period
$I_{soll}$ is a target motor current
θG is the gear mechanism temperature to be determined
qG(t) is a time-dependent drive-side position
θM(t) is the time-dependent motor temperature
τG(t) is a time-dependent drive-side torque
$I_{ist}(t)$ is a time-dependent actual motor current
$\tau M_{soll}$ is a drive-side target torque
$k_T$ is a proportionality factor according to $\tau M = k_T I$
d/dtqG(t) is the first derivative with respect to time of the drive-side position (i.e., a drive-side velocity)
$d/dt^2 qG(t)$ is the second derivative with respect to time of the drive-side position, (i.e., a drive-side acceleration).

6. The method of claim 5, comprising using the most recently obtained value of the gear mechanism temperature as a starting value for numerical minimization of the expression.

7. The method of claim 4, wherein determination of the gear mechanism temperature comprises minimizing the following expression relative to θG:

$$|\tau M_{soll}(\theta G; d/dt qG(t), d/dt^2 qG(t), \theta M(t), \tau G(t)) - \tau M_{ist}(t)|^2$$

wherein:
t designates the time coordinate
θG is the gear mechanism temperature to be determined
qG(t) is a time-dependent drive-side position
θM(t) is the time-dependent motor temperature
τG(t) is a time-dependent drive-side torque
$I_{ist}(t)$ is a time-dependent actual motor current
$\tau M_{soll}$ is a drive-side target torque
$\tau M_{ist}$ is a drive-side actual torque
d/dtqG(t) is the first derivative with respect to time of the drive-side position (i.e., a drive-side velocity)
$d/dt^2 qG(t)$ is the second derivative with respect to time of the drive-side position (i.e., a drive-side acceleration).

8. The method of claim 7, comprising using the most recently obtained value of the gear mechanism temperature as a starting value for numerical minimization of the expression.

9. The method of claim 1, further comprising:
measuring drive-side parameters of the manipulator at discrete time intervals;
periodically determining the heat input and heat conduction in the mechanical structure of the manipulator on the basis of a heat conduction model of the manipulator; and
determining an approximate gear mechanism temperature based on the determined heat conduction.

10. The method of claim 9, further comprising:
determining an ambient temperature at discrete time intervals; and
periodically determining heat radiation from the manipulator to the environment based on the determined ambient temperature;
wherein determining the gear mechanism temperature comprises determining the temperature based on the determined heat conduction and the determined heat radiation.

11. The method of claim 1, further comprising:
measuring at least one of a drive-side motor current or motor position associated with the at least one shaft;
determining a characteristic diagram of the gear mechanism friction torque model based on the gear mechanism temperatures; and
determining a value of the gear mechanism temperature or a gear mechanism friction using the gear mechanism friction torque model and the measured drive-side motor current or motor position.

12. The method of claim 11, wherein determining the characteristic diagram and the gear mechanism friction model comprises determining the characteristic diagram and the gear mechanism friction model before operation of the manipulator and storing information related to the diagram and model for later use.

13. The method of claim 1, comprising:
measuring drive-side motor current or motor position at discrete intervals;
storing values of the measured drive-side motor current or motor position during a predetermined time period, wherein the time period is an order of magnitude smaller than the time it takes for the gear mechanism to change temperature; and
approximating the gear mechanism temperature at the predetermined time period using the stored values of the drive-side motor current or motor position.

14. The method of claim 13, wherein the predetermined time period of storing measured values of drive-side motor current or motor position is the same order of magnitude as the time interval for measuring drive-side motor current or motor position.

15. The method of claim 1, further comprising:
determining initial values for at least one of target motor positions or target motor currents corresponding to a desired sequence of manipulator positions to effect a desired movement of the manipulator with respect to geometry, time variation, and velocities of the movement.

16. The method of claim 15, further comprising:
determining new values for at least one of target motor positions or target motor currents corresponding to the desired sequence of manipulator positions prior to interpolating the desired sequence of manipulator positions if a predetermined time has passed between the determination of the initial values and the interpolation.

17. The method of claim 1, further comprising:
determining at least one of actual motor positions or motor currents based on the gear mechanism temperature; and
interpolating a desired sequence of manipulator positions needed to effect a desired movement of the manipulator based on the determined actual motor positions or motor currents.

18. A device for controlling an automatically controlled robotic manipulator having shafts driven by motors and associated gear mechanisms, the device comprising:
a control unit that determines a gear mechanism friction torque as a function of a gear mechanism temperature using a dynamic manipulator model that accounts for friction torques in the gear mechanisms, the model including a gear mechanism friction torque model for at least one shaft based on driven-side shaft velocities and shaft accelerations; and a temperature determination unit that determines a gear mechanism temperature;

the determination unit generating a signal related to the gear mechanism temperature and communicating the signal to the control unit;

the control unit actuating at least one motor of the robotic manipulator based on the determined a gear mechanism friction torque.

19. The device of claim 18, wherein the temperature determination unit comprises a temperature sensor that is integrated in a gear mechanism.

20. The device of claim 18, wherein the temperature determination unit is adapted to measure a temperature of the gear mechanism oil.

21. The device of claim 18, further comprising a heat conduction model in the control unit, whereby the control unit approximates gear mechanism temperature based on heat input into the mechanical structure of the robotic manipulator.

22. The device of claim 21, wherein the control unit determines heat input into the mechanical structure of the robotic manipulator based on a measured speed of the gear mechanism and a measured temperature at the motor.

23. The device of claim 21, further comprising:

an ambient temperature unit communicating with the control unit and adapted to determine an ambient temperature of the robotic manipulator at defined time intervals;

the control unit periodically determining heat radiation from the robotic manipulator to the environment based on the determined ambient temperature;

the temperature determination unit determining gear mechanism temperature based on the heat input and heat radiation.

24. The device of claim 18, further comprising:

a characteristic diagram unit communicating with the control unit and determining a characteristic diagram of the gear mechanism friction torque model based on gear mechanism temperatures using values of actual drive-side motor current or motor position of the robotic manipulator;

the control unit determining at least one of a gear mechanism temperature or a gear mechanism friction torque as a function of the actual drive-side motor current or motor position.

25. The device of claim 24, further comprising a first storage unit communicating with the control unit and storing the characteristic diagram or the gear mechanism friction torque model for use by the control unit during operation of the robotic manipulator.

26. The device of claim 18, further comprising a second storage unit that continuously stores values of drive-side motor current or motor position at predetermined intervals and to hold the stored values for a predetermined time period, wherein the time period is an order of magnitude smaller than the rate of change of temperature of the gear mechanism.

27. The device of claim 26, wherein the time period is approximately 0.1 second to approximately 1.0 second.

28. The device of claim 26, wherein the time period is approximately 0.5 second.

29. The device of claim 26, wherein the second storage unit comprises a circular buffer.

30. The device of claim 26, wherein the control unit determines gear mechanism temperature at predetermined intervals using values stored in the second storage unit.

31. The device of claim 30, wherein the storage time period and the interval for determining gear mechanism temperature are on the same order of magnitude.

32. The device of claim 18, wherein the control unit determines gear mechanism temperature by minimizing the value of an expression relative to $\theta G$:

$$\int_{t\_act-T}^{t\_act} |I_{soll}(\vartheta G; d/dt qG(t), d/dt^2 qG(t), \vartheta M(t), \tau G(t)) - I_{ist}(t)|^2 w(t) dt =$$

$$\int_{t\_act-T}^{t\_act} |\tau M_{soll}(\vartheta G; d/dt qG(t), d/dt^2 qG(t), \vartheta M(t), \tau G(t))/k_T - I_{ist}(t)|^2$$

$$w(t) dt =$$

$$\int_{t\_act-T}^{t\_act} \left| \frac{((\tau G + \tau RG)/R - \tau RM)_{soll} \times}{(\vartheta G; d/dt qG(t), d/dt^2 qG(t), \vartheta M(t), \tau G(t))/k_T - I_{ist}(t)} \right|^2 w(t) dt$$

wherein:

t designates the time coordinate t_act is a current time point

T is the storage time period $I_{soll}$ is a target motor current $\theta G$ is the gear mechanism temperature to be determined qG(t) is a time dependent drive-side position $\theta M(t)$ is a time-dependent motor temperature $\tau G(t)$ is a time-dependent drive-side torque $I_{ist}(t)$ is a time-dependent actual motor current $\tau M_{soll}$ is a drive-side target torque $k_T$ is a proportionality factor according to $\tau M = k_T I$ d/dtqG(t) is the first derivative with respect to time of the drive-side position (i.e., a drive-side velocity)

$d/dt^2 qG(t)$ is the second derivative with respect to time of the drive-side position (i.e., a drive-side acceleration).

33. The device of claim 18, wherein the control unit determines gear mechanism temperature by minimizing the value of an expression relative to $\theta G$:

$$|\tau M_{soll}(\theta G; d/dt qG(t), d/dt^2 qG(t), \theta M(t), \tau G(t)) - \tau M_{ist}(t)|^2$$

wherein:

t designates the time coordinate $\theta G$ is the gear mechanism temperature to be determined qG(t) is a time dependent drive-side position $\theta M(t)$ is a time-dependent motor temperature $\tau G(t)$ is a time-dependent drive-side torque $I_{ist}(t)$ is a time-dependent actual motor current $\tau M_{soll}$ is a drive-side target torque $\tau M_{ist}$ is a drive-side actual torque d/dtqG(t) is the first derivative with respect to time of the drive-side position (i.e., a drive-side velocity)

$d/dt^2 qG(t)$ is the second derivative with respect to time of the drive-side position (i.e., a drive-side acceleration).

34. The device of claim 18, wherein:

the control unit determines values for target motor positions or motor currents corresponding to a desired sequence of manipulator positions to effect a desired movement of the manipulator with respect to geometry, time variation, and velocities of the movement;

the control unit interpolates between the target motor positions or motor currents;

the device further comprises a time measurement unit communicating with the control unit and indicating when a predetermined time has lapsed between the determination of values for target motor positions or motor currents and interpolation of the values; and the control unit determines new values for target motor positions or motor currents when the time measurement unit indicates that the predetermined time has lapsed.

* * * * *

UNITED STATES PATENT AND TRADEMARK OFFICE
CERTIFICATE OF CORRECTION

| | | |
|---|---|---|
| PATENT NO. | : 9,579,792 B2 | Page 1 of 1 |
| APPLICATION NO. | : 11/719182 | |
| DATED | : February 21, 2017 | |
| INVENTOR(S) | : Gerhard Hietmann et al. | |

It is certified that error appears in the above-identified patent and that said Letters Patent is hereby corrected as shown below:

In the Specification

Column 16, Line 1, delete "gear mechanism . . . is them made available to" and insert -- gear mechanism . . . is then made available to --.

In the Claims

Claim 5
Column 17, Line 10, delete "list(t) is a time-dependent actual motor current second . . . τMsoll is a drive-side target torque" and insert -- list(t) is a time-dependent actual motor current second . . . w(t) is a time-dependent weighting function . . . τMsoll is a drive-side target torque --.

Claim 5
Column 17, Line 16, delete "the drive-side position, (i.e., a drive-side acceleration)." and insert -- the drive-side position (i.e., a drive-side acceleration.) --.

Claim 18
Column 19, Lines 11-12, delete "manipulator based on the determined a gear mechanism friction torque" and insert -- manipulator based on the determined gear mechanism friction torque --.

Claim 32
Column 20, Line 10, delete "list(t) is a time-dependent actual motor current second . . . τMsoll is a drive-side target torque" and insert -- list(t) is a time-dependent actual motor current second . . . w(t) is a time-dependent weighting function . . . τMsoll is a drive-side target torque --.

Signed and Sealed this
Thirtieth Day of May, 2017

Michelle K. Lee
*Director of the United States Patent and Trademark Office*